United States Patent [19]

Hoffman

[11] 3,831,454
[45] Aug. 27, 1974

[54] FLUID ROTOR MOTION SENSOR
[75] Inventor: Jay Hoffman, Livingston, N.J.
[73] Assignee: The Singer Company, New York, N.Y.
[22] Filed: Mar. 25, 1971
[21] Appl. No.: 127,906

[52] U.S. Cl............ 73/504, 73/515, 73/516 LM, 74/5
[51] Int. Cl. ............................................ G01p 9/00
[58] Field of Search...... 74/5; 73/504, 515, 516 LM

[56] References Cited
UNITED STATES PATENTS

| | | | |
|---|---|---|---|
| 1,841,606 | 1/1932 | Kollsman | 74/5 X |
| 1,890,831 | 12/1932 | Smyth | 73/504 |
| 2,319,940 | 5/1943 | Marrison | 73/516 LM |
| 2,980,363 | 4/1961 | Schonstedt | 74/5 X |
| 3,083,578 | 4/1963 | Rosato et al. | 73/504 |
| 3,142,991 | 8/1964 | Pittman | 74/5 X |
| 3,148,550 | 9/1964 | Iddings | 73/504 X |

Primary Examiner—Carl D. Quarforth
Assistant Examiner—P. K. Pavey
Attorney, Agent, or Firm—T. W. Kennedy

[57] ABSTRACT

A multipurpose sensing device is disclosed having the sensing capabilities of both a two axis rate gyro and a single axis accelerometer wherein these capabilities are achieved by measuring the displacement of a rotating body of fluid which results when the device disclosed is subjected to angular velocity rates or rectilinear accelerations.

10 Claims, 6 Drawing Figures

INVENTOR.
JAY HOFFMAN

INVENTOR.
JAY HOFFMAN

INVENTOR.
JAY HOFFMAN
ATTORNEYS

FLUID ROTOR MOTION SENSOR

The present invention relates to multisensors and in particular to angular rate and rectilinear acceleration sensors wherein the motion sensitive element is comprised of a rotating body of fluid.

In conventional gyroscopes the motion sensitive or inertial element, the rotor, is generally made from a solid material necessitating some form of rotor suspension system which will isolate the gyroscopic device from angular rotation of the instrument housing. In addition, the suspension system must cope with acceleration, vibration and shock levels characteristic to its particular application. The quality of isolation and environmental protection is a key factor in the performance of the instrument.

Further, in conventional rate gyroscopes a spring is required to restrain the movement of a supporting gimbal framework in an amount proportional to the input rate. In addition, damping means are required to suppress gimbal oscillation upon removal of the externally applied rate, said damping means usually consisting of either a hydraulic dashpot arrangement, an eddy current damping device or damping fluid enveloping the gimbal. These requirements result in a relatively complex device.

In accordance with one embodiment of the present invention, a simple, reliable gyro having two perpendicular input axes is provided wherein the technique for measuring angular rates consists in measuring the translatory motion imparted to a rotating fluid disk. The fluid disk is set into rotation by the viscous coupling between a rotating cavity and the fluid contained therein. When angular rates occur about the input axes of the gyroscope, gyroscopic forces are set up which are linearly distributed along the input axes of the gyro thereby causing a translatory motion to that portion of the fluid which is contained within an annular enclosure — which is an integral part of the rotating cavity. With an appropriate form of pickoff the amount of translatory motion, which bears a calibratable relationship to the applied input rate, can be measured.

Through the use of the fluid as the inertial element, the requirement for some form of suspension system is eliminated since the properties of the fluid inherently provide the isolation needed. Further when used in rate application there is no requirement for a gimbal restraining spring as there is with conventional rate gyros because it is the enclosed translating fluid which is the measurable item as opposed to gimbal displacement in the conventional gyros. Further, there is no requirement to provide any additional means for damping as required in conventional rate gyro applications since this also is an inherent characteristic of the fluid.

Heretofore conventional acceleration measuring devices have usually been of the force balance pendulous type which consists of a proof mass suspended from a flexure hinge which moved along an acceleration sensitive axis, a pickoff device which detects motion of the mass and a restraining coil which repositions the proof mass to a null position upon application of an electrical signal proportional to the pickoff signal. These devices are relatively delicate to handle, complex and expensive.

Therefore, in an additional operational mode or application of the present invention, a simple reliable, inexpensive accelerometer is provided wherein the technique for measuring accleration consists in measuring the translatory motion resulting from the applied acceleration to a rotating fluid disk.

Accordingly, it is one object of the invention to provide a simple and reliable rate gyroscope with two input axes.

It is another object of the invention to provide a two-axis rate gyro using fluid as the inertial element.

It is a still further object of the invention to provide a two-axis rate gyro using fluid within a rotating cavity as the inertial element, and taking advantage of the system dynamics to provide the equivalent of the restraining element used in prior rate gyro configurations.

It is still a further object of the invention to provide a two-axis rate gyro using fluid within a rotating cavity as the inertial element and an appropriate pickoff arrangement which monitors the amount of translation of the fluid in an annular enclosure which is integral to the rotating cavity.

It is a still further object of the invention to provide a two-axis gyro having a fluid rotor which inherently has a high degree of immunity from the effects of vibration and shock.

It is a still further object of the invention to provide a two-axis fluid rotor rate gyro which does not require damping or restraining springs or other complexities of prior rate gyros.

It is a still further object of the invention to provide a simple, reliable, inexpensive single axis accelerometer.

Further objects and advantages of the present invention will become readily apparent as the following detailed description of a specific embodiment of the invention is read in conjunction with the drawings, wherein.

Figure 1:
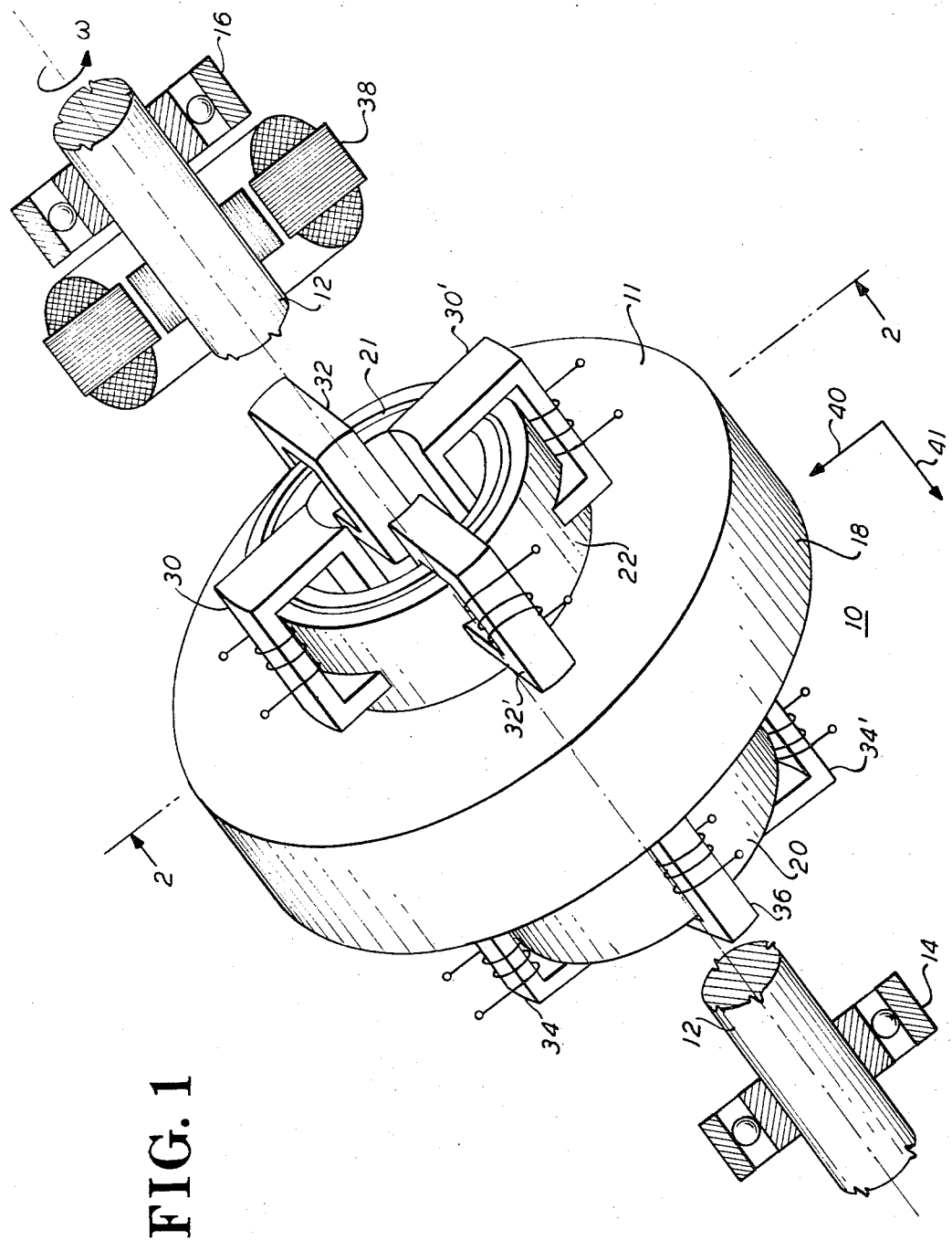
FIG. 1 is a perspective view of a multipurpose sensor embodying features of the present invention.

Referring to FIG. 1, a multipurpose sensor 10 is illustrated which embodies features of the present invention. It comprises a shaft 12 rotatably supported by a pair of ball bearings 14 and 16. A cylindrical enclosure 18, is rigidly attached to the shaft 12. Electrically nonconductive hollow annular enclosures 20 and 22 are embedded in opposite faces 11 and 13 (not shown) of the cylindrical enclosure. Enveloping each of the annular enclosures 20 and 22, are four transformer type, pickoff devices 30,30', 32,32', 34,34', 36,36' (not shown). Each pair of transformers are diametrically aligned with one another along each gyro input axis 40 and 41. Spin motor 38 rotates the housing formed by cylindrical enclosure 18 and the annular enclosures 20 and 22, at a constant angular velocity, $\omega$, relative to the stationary pickoff devices which are affixed to the sensor support housing (not shown) in any known manner.

Figure 2:
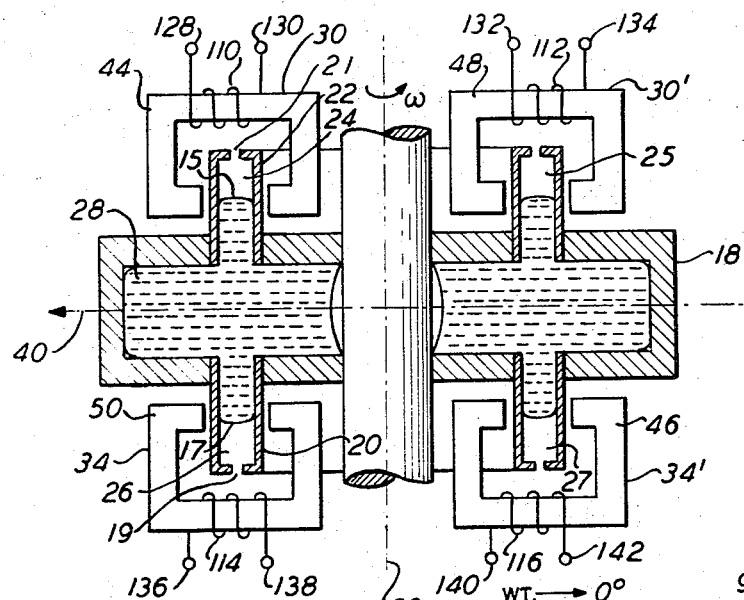
FIG. 2 is a fragmentary sectional view taken along line 2—2 of FIG. 1.

Referring to FIG. 2, the cavity formed by the cylindrical enclosure and the annular enclosures is partially filled with the liquid metal 28. The liquid metal 28, is viscously coerced to follow the housing formed by enclosures 18, 20 and 22 at the same angular velocity, $\omega$. Centrifugal force causes the liquid to slide out to the maximum radial confines of the enclosure. Because of the restraints of the combined enclosure, a small volume of liquid is forced to symmetrically dispose itself into enclosures 20 and 22. Pressure relief slits 19 and 21 are present in each of the annular enclosures 20 and 22. These serve to relieve any pressure build up due to the dispersion of the fluid 28 in the enclosures 20 and 22. For zero angular rate input the fluid level is designated 15 for enclosure 22 and 17 for enclosure 20.

Figure 3:
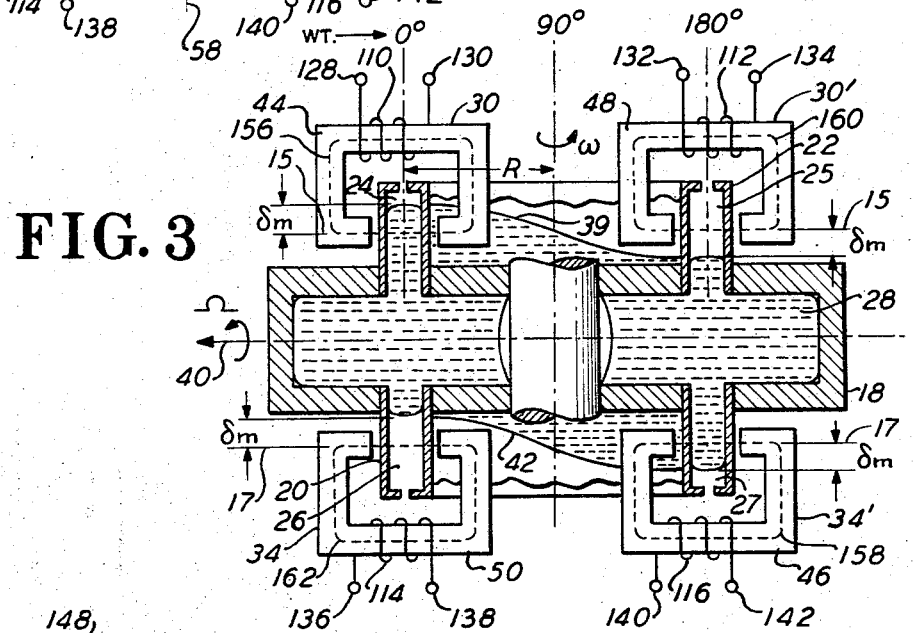
FIG. 3 is a fragmentary sectional view of the structure illustrated in FIG. 2 with only an input rate applied.

Consider what happens when an angular input, $\Omega$ is applied about input axis 40, in the manner indicated in FIG. 3. When the rotating liquid 28 is subjected to angular rates about an input axis 40, in accordance with well-known gyroscopic principles gyroscopic forces, which are proportional to this input rate are caused to act upon the liquid in a direction perpendicular to the plane containing the cylindrical enclosure 18. The forces cause the liquid 28, contained within the angular enclosures 20 and 22 to translate higher up into cavities 24 and 27 and lower in cavities 25 and 26. This translatory motion will bear a fixed and proportional relationship to this input rate. Referring to FIG. 3, the translatory motion of the liquid mass contained within enclosure 22 is governed by the equation:

$$(2m_B R\omega\Omega) \cos \omega t = m_B d^2\delta/dt^2 + f\, d\delta/dt + K\delta \quad (1)$$

where:

$m_B$ = fluid mass within the enclosure 22
$R$ = distance from the center of rotation to the mass center of $m_B$
$\omega$ = angular velocity of the enclosed liquid
$\Omega$ = the input angular velocity
$f$ = viscous coefficient constraining the motion of $m_B$
$K$ = spring rate constraining the motion of $m_B$ i.e., surface tension "spring"
$\delta$ = displacement of $m_B$ from reference line 15

By solving (1) for $\delta$ the following is obtained:

$$\delta = (2m_B R\omega\Omega \cos \omega t)/\sqrt{(K-m_B\omega^2)^2+f^2\omega^2} \quad (2)$$

For practical values of $\omega$, $\omega > \sqrt{K/m_B}$ such that equation 2 simplifies to the following:

$$\delta = [2m_B R\omega\Omega \cos(\omega t+\pi)]/(m_B\omega^2) \quad (3)$$

which simplifies to:

$$\delta = (2R\Omega)/\omega \cos \omega t \quad (4)$$

From the equation it is seen that around the enclosure 22, the fluid level 39 will vary about reference level 15 in a cosine manner. $\delta$ varies from a maximum value $\delta_m = (2R\Omega)/\omega$ at $\omega t = 0$, to zero at $\omega t = 90°$ to $-\delta_m$ at $\omega t = 180°$. The angles $\omega t = 0°$ and $180°$ are diametrically opposed along the input axis whereas $\omega t$ equal to $90°$ is located along the input axis 41, which is in a quadrature relationship with input axis 40.

In a similar fashion, the fluid level 42, in the lower annular enclosure 20, will vary in the same harmonically varying manner except that the maximum translation up into enclosure 20 will occur 180° away from that point for enclosure 22.

Figure 4:
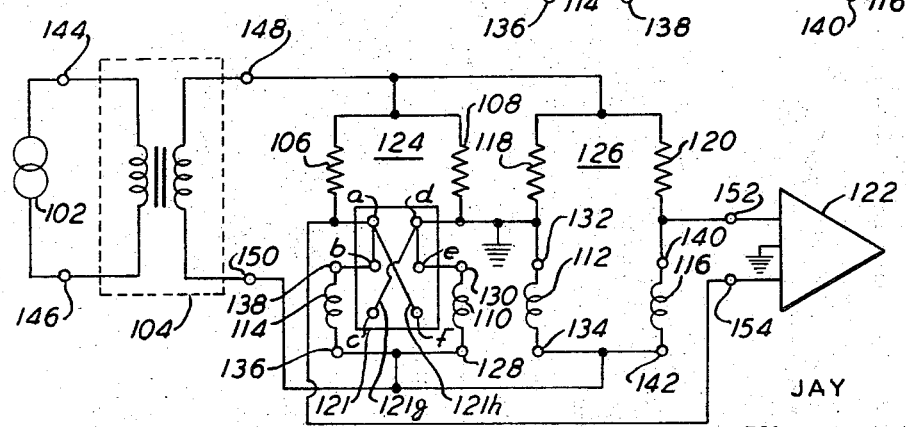
FIG. 4 is a schematic diagram of the pickoff scheme configured to sense angular input rates.

In FIG. 4 we have a schematic view of an appropriate technique to be used to sense the translation of the fluid. An A.C. voltage source 102°, is connected to the primary terminals 144 and 146 of an isolation transformer 104. The secondary terminals 148 and 150 of the isolation transformer are connected to each of two bridge circuits 124 and 126. Secondary terminal 148 is connected to one end of bridge resistors 106, 108, 118 and 120. Secondary terminal 150 is connected to terminals 128, 134, 136 and 142 of transformer coils 110, 112, 114 and 116 respectively. It can be seen in FIG. 2 that transformer coils 110, 112, 114 and 116 are associated with transformers 30,31', 34,34' respectively. The other terminal of each transformer coil is connected to the other end of one of the bridge resistors, with coils 110 and 114 being connected to the bridge resistors 108 and 106 respectively, through a double pole double throw (dpdt) switch, 121. This switch preferably an automatic one can be a relay or any all solid state device which can implement the double pole, double throw function. Terminal 138 is connected to pole 121b and terminal 130 is connected to pole 121e. The other end of resistor 106 is connected to contact 121a while the other end of resistor 108 is connected to contact 121d. When poles 121b and 121e are connected to contacts 121a and 121d respectively then terminal 138 is connected to resistor 106 and terminal 130 to resistor 108. Further, terminals 132 and 140 are permanently connected to the other end of resistors 118 and 120 respectively. The junction formed by terminal 130 and resistor 108 is connected to the junction formed by terminal 132 and resistor 118 and also connected to ground reference. The junction formed by terminal 138 and resistor 106 is connected to a first input, 152, of a differential amplifier 122 and the junction formed by terminal 140 and resistor 120 is connected to a second input, 154, of the differential amplifier.

Referring to FIG. 2, it is obvious that in the absence of an input angular rate the reluctance path formed by the core of each transformer and the liquid metal interposed between opposing faces of each transformer core is the same. Consequently, the inductance of each winding is the same therefore each of the bridges 124 and 126 is balanced. Consequently, the differential voltage as seen by the differential amplifier 122 is 0 volts.

When an input rate is applied in the manner indicated in FIG. 3, the liquid metal translates in accordance with equation 4 above. The reluctance path 156, formed by core 44 and the liquid metal interposed between the opposing faces of core 44 is tending towards a minimum as is the path 158 formed by core 46 and liquid metal in the appendage cavity 27. At the same time, reluctance path 160 formed by core 48 and the liquid metal in appendage cavity 25 is tending toward a maximum as is the path 162 formed by core 50 and the liquid metal in the appendage cavity 26.

Because of these variations in these reluctance paths, the inductance of windings 110 and 116 are tending towards a maximum and the inductance of windings 112 and 114 are tending towards a minimum. Because of this variation in inductance, the bridges 124 and 126 become unbalanced with the a.c. voltage at input terminal 152 tending towards a maximum as the a.c. voltage at input terminal 154 tends towards a minimum.

The variation in reluctance paths as hereinabove described with the consequent effect on inductance and voltage will bear a proportional relationship to the liquid metal displacement $\delta_m$, which in turn is proportional to the magnitude and direction of the applied input angular rate about axis 40.

If the input rate indicated in FIG. 3 is reversed in angular direction the liquid in enclosures 20 and 22 will translate into a position wherein the fluid level is tending toward a low point in cavities 24 and 27 and towards a high point in cavities 25 and 26. As a result, the variation in reluctance paths of the different transformers will be opposite to that indicated above, with the result that the voltage at input terminal 152 is now tending towards a minimum while the a.c. voltage at terminal 154 tends towards a maximum. Hence, the voltage output of amplifier 122 will be of opposite polarity to that indicated above. Thus, this pickoff scheme provides a technique for monitoring magnitude and direction of the input rate applied to axis 40.

Figure 5:
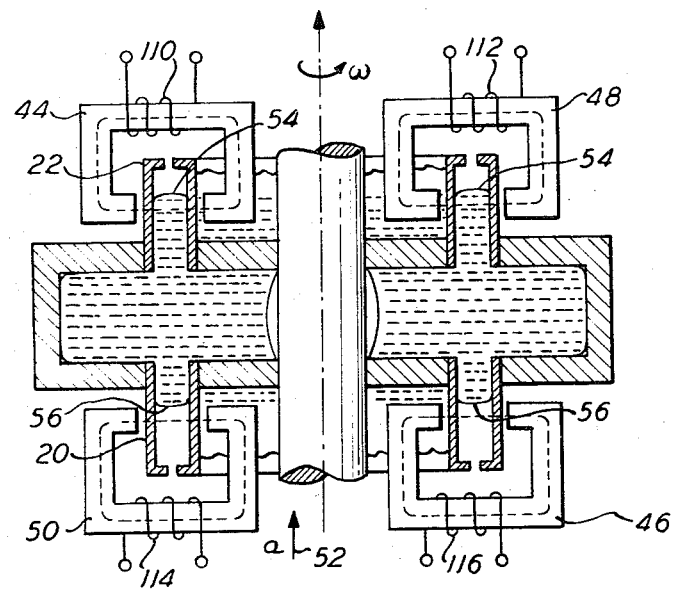
FIG. 5 is a fragmentary sectional view taken along line 2—2 of FIG. 1 with only a rectilinear acceleration applied along spin axis.

An observation to be made at this point is that rectilinear acceleration applied along the spin axis 58, of the device will also cause the liquid 28, to translate within enclosures 20 and 22. For example, referring to FIG. 5, if a constant acceleration a, is applied to the device in the direction shown 52, the liquid will translate by an amount proportional to that acceleration. The amount of displacement $\delta$, can be expressed by the readily determined equation $\delta = (m_B a)/K$. For the ensuing discussion, assume that the device is being subject to an acceleration which causes the fluid to translate to level 54 in enclosure 22 and level 56 in enclosure 20.

The reluctance paths of the transformer cores 44 and 48 are decreased by the same amount since the liquid translates by a constant amount within enclosure 22 so that the inductance of windings 110 and 112 increases by the same amount. Similarly, the reluctance paths of cores 50 and 46 are increased by an identical amout so that the inductance of windings 114 and 116 decreases by the same amount.

If the pickoff windings are connected as in FIG. 4, the bridge circuits 124 and 126 each will become unbalanced, however, the voltage out of differential amplifier 122 would remain at zero because the voltage at input terminal 152 and 154 would be equal in magnitude.

Figure 6:
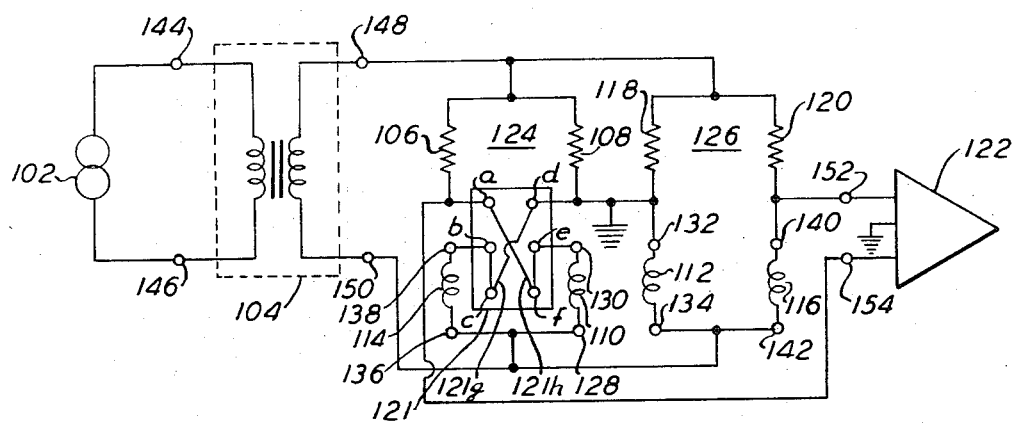
FIG. 6 is a schematic diagram of the pickoff scheme configured to sense rectilinear acclerations applied along spin axis.

The combined effects on the fluid level within the rotating cavity of an angular rate applied along the input axis 40 as well as the effect due to accelerations along the spin axis 58 may be determined by superimposing the individual effects described above. It can be seen that although there is physical translation of the liquid due to both causes, by utilizing the pickoff scheme of FIG. 4, the effect at the output of amplifier 122, due to acceleration along the spin axis 58, may be eliminated. Referring to FIG. 6, if switch 121 is activated so that poles 121b and 121e are now connected to contacts 121c and 121f respectively, and contacts 121c and 121f are connected to contacts 121d and 121a respectively by way of jumper wires 121g and 121h what occurs is that coils 114 and 110 are effectively interchanged in their positon in bridge circuit 124. When the circuit is configured as in FIG. 6, the bridge circuit 124 and 126 will present a differential voltage to amplifier 122 only when there is an acceleration along the spin axis, irregardless of whether or not there is an angular rate applied to the input axes 40 and 41. Thus, the device can be utilized as a single axis accelerometer.

It should be noted that when the device is configured to sense angular rates, it has the capability as well to sense angular rates about the input axis 41, in quadrature relationship with input axis 40. The operation of the device would be as described above except that the windings associated with transformer 32,32' and 36,36' would be used in an appropriate bridge configuration. Hence, the device has the capability of sensing angular rates about two input axes in quadrature.

While it will be apparent, the embodiments of the invention herein disclosed are well calculated to fulfill the object of the invention, it will be appreciated that the invention is suceptible to modification, variation and change without departing from the proper scope or fair meaning of the following claims.

What is claimed is:

1. A multipurpose sensing device for measuring angular velocity and rectilinear accelerations comprising:

rotatable enclosure means including a cylindrical housing having a pair of end walls axially spaced and perpendicular to the longitudinal axis of said housing, said enclosure means having a first input axis disposed perpendicular to said longitudinal axis and a second axis disposed perpendicular to a plane formed by said longitudinal axis and said first input axis, said enclosure means further including at least one hollow, annular enclosure embedded in and projecting outwardly from one of said end walls, said annular enclosure opening into said cylindrical housing, stationary pickoff means, drive means for rotating said enclosure means relative to said pickoff means, and a fluid partially filling said enclosure means, said fluid being viscously coerced to rotate with said enclosure means at the same angular speed to thereby form a rotating fluid disc within said cylindrical housing, said disc being positioned at least beneath said annular enclosure, said pickoff means positioned adjacent to said hollow annular enclosure to thereby detect the displacement of said fluid within said annular enclosure in response to forces created by said angular velocity and rectilinear accelerations.

2. A device as claimed in claim 1, wherein said enclosure means further includes a second hollow annular enclosure embedded in and projecting outwardly from the other of said end walls, said second annular enclosure opening into said cylindrical housing, and wherein a second stationary pickoff means is positioned adjacent to said second annular enclosure to thereby detect displacement of said fluid within said second annular enclosure.

3. A device as claimed in claim 2, wherein said first and second hollow annular rings are composed of an electrically non-conducting material.

4. A device as claimed in claim 3, wherein said fluid is a liquid metal, and wherein said pickoff means includes electromagnetic means.

5. A device as claimed in claim 4, wherein said electromagnetic means comprises,
- a first transformer pair axially spaced along said longitudinal axis, said first transformer pair coacting with the fluid dispersed in said first and second annular rings,
- a second transformer pair axially spaced along said longitudinal axis, said second transformer pair being located diametrically opposite to said first transformer pair, said second transformer pair coacting with the fluid dispersed in said first and second annular rings,
- a third transformer pair axially spaced along said longitudinal axis, said third transformer pair bearing a quadrature relationship in its location to said first and second transformer pair, said third transformer pair coacting with the fluid dispersed in said first and second annular rings, and
- a fourth transformer pair axially spaced along said longitudinal axis, said fourth transformer pair being located diametrically opposite to said third transformer pair, said fourth transformer pair coacting with the fluid dispersed in said first and second annular rings.

6. A device as claimed in claim 5, wherein said pickoff means further comprises, a.c. voltage means, and electrical isolation means having a primary winding and a secondary winding including a first and second terminal, said a.c. voltage means being adapted to electrically drive said primary winding.

7. A device as claimed in claim 6, wherein said pickoff means further comprises, a signal generating means electrically connected to the first and second terminal of said secondary winding,
- said generating means comprising a first pair of bridge circuits and a first differential amplifier means, said first amplifier means coacting with said first pair of bridge circuits so as to output a first electrical signal when a first angular velocity rate is applied to said first input axis or when a rectilinear accleration is applied collinearly along said longitudinal axis,
- said generating means further comprising a second pair of bridge circuits and a second differential amplifier amplifier means, said second amplifier means coacting with said second pair of bridge circuits so as to output a second electrical signal when a second angular velocity rate is applied to said input axis.

8. A device as claimed in claim 7, wherein said first pair of bridge circuits includes,
- a first pair of bridge resistors, switch means having a first and second operating mode, and said switch means further having a pair of contacts and a pair of poles, said pair of contacts being serially connected to said pair of bridge resistors and said pair of poles of said switch means being serially connected to said first transformer pair, and wherein said first pair of bridge circuits further includes a second pair of bridge resistors, said second pair of bridge resistors being serially connected to said second transformer pair, and wherein said second pair of bridge circuits includes a third pair of bridge resistors, said third pair of bridge resistors being serially connected to said third transformer pair, and wherein said second pair of bridge circuits further includes a fourth pair of bridge resistors, said fourth pair of bridge resistors being serially connected to said fourth transformer pair.

9. A device as claimed in claim 1, wherein said drive means comprises a motor means coaxially aligned with a shaft, said shaft being rigidly attached to said enclosure means and coacting with said motor means to cause said enclosure means to rotate at a predetermined angular speed.

10. A device as claimed in claim 1, wherein said pickoff means includes a transfer means, said transfer means having a first operational position whereby said sensing device can perform as a rate gyroscope measuring velocities applied angularly about said first and second input axes, and wherein
- said transfer means has a second operational position whereby said sensing device can perform as an accelerometer measuring accelerations applied collinearly along said longitudinal axis.

* * * * *